United States Patent
Shin et al.

(10) Patent No.: US 8,582,574 B2
(45) Date of Patent: Nov. 12, 2013

(54) ACCESS DEVICE FOR PREVENTING TRANSMISSION OF COPYRIGHTED CONTENT TO EXTERNAL NETWORK AND METHOD FOR THE SAME

(75) Inventors: Dong-yun Shin, Seongnam-si (KR); Sung-joon Park, Seoul (KR); Yoo-seung Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1245 days.

(21) Appl. No.: 11/505,786

(22) Filed: Aug. 18, 2006

(65) Prior Publication Data

US 2007/0047543 A1 Mar. 1, 2007

(30) Foreign Application Priority Data

Aug. 24, 2005 (KR) .................. 10-2005-0077894

(51) Int. Cl.
*H04L 12/28* (2006.01)
*H04L 12/56* (2011.01)

(52) U.S. Cl.
CPC .................................... *H04L 45/00* (2013.01)
USPC ........... 370/392; 370/230; 370/255; 370/389; 370/474; 726/27

(58) Field of Classification Search
USPC ............. 370/230, 255, 392, 389, 474; 726/27
See application file for complete search history.

(56) References Cited

U.S. PATENT DOCUMENTS

| 2004/0136356 | A1* | 7/2004 | Kuo et al. ............. | 370/351 |
| 2004/0151179 | A1* | 8/2004 | Andre et al. ........... | 370/392 |
| 2007/0009232 | A1* | 1/2007 | Muraki et al. .......... | 386/95 |

FOREIGN PATENT DOCUMENTS

| JP | 9-98185 | | 4/1997 |
| JP | 2001-230806 | A | 8/2001 |
| JP | 2004-180020 | A | 6/2004 |
| JP | 2004-295337 | A | 10/2004 |
| KR | 10-2002-0034280 | A | 5/2002 |
| KR | 10-2003-0018018 | A | 3/2003 |
| KR | 10-2003-0095752 | A | 12/2003 |
| KR | 10-2004-0017220 | A | 2/2004 |
| WO | WO 2004/023759 | A1 | 3/2004 |
| WO | WO 2005/002034 | A1 | 3/2005 |

OTHER PUBLICATIONS

Address allocation for Private Internets, RFC 1918, Rekhter et al, Feb. 1996.*
DTCP vol. 1 Supplement E Mapping DTCP to IP, Feb. 28, 2005.*
Work Plan for Localizing Transmissions, DTLA—Sep. 2003.*

* cited by examiner

*Primary Examiner* — Jae Y Lee
*Assistant Examiner* — Aixa A Guadalupe Cruz
(74) *Attorney, Agent, or Firm* — Sughrue Mion, PLLC

(57) ABSTRACT

An access device and method for preventing transmission of copyrighted contents to an external network and a method for the same. The access device includes a packet-header analyzer analyzing a header of a packet received from a home network device, a copyrighted-content sensor detecting whether the packet includes copyrighted content as a result of the analysis, an address converter for converting a packet source IP address into an IP address supported by the external network if a packet destination address is an external network address as a result of the analysis, a mapping-table generator generating a mapping table for managing a mapping a relationship between the packet source IP address and the converted IP address, and a packet transmitter transmitting the packet to the IP address supported by the external network and discarding the packet to block transmission of the copyrighted content to the external network if the copyrighted-content sensor detects that the packet includes the copyrighted content.

19 Claims, 5 Drawing Sheets

ACCESS DEVICE FOR PREVENTING TRANSMISSION OF COPYRIGHTED CONTENT TO EXTERNAL NETWORK AND METHOD FOR THE SAME

CROSS-REFERENCE TO RELATED APPLICATIONS

This application claims priority from Korean Patent Application No. 10-2005-0077894 filed on Aug. 24, 2005 in the Korean Intellectual Property Office, the disclosures of which are incorporated herein by reference in their entirety.

BACKGROUND OF THE INVENTION

1. Field of the Invention

The present invention relate to an access device for preventing transmission of copyrighted contents to an external network and a method for the same, and more particularly, to an access device for preventing transmission of copyrighted contents to an external network and a method for the same, in which the copyrighted contents downloaded to a device connected to a home network are prevented from being shared with unauthorized users connected to the external network, while the downloaded contents can be freely shared between authorized users connected to the home network.

2. Description of the Related Art

In the related art, web content providers provide copyrighted contents based on paid subscription and limits (or prevents) the contents from being shared with unauthorized users. To protect various audiovisual (AV) contents such as internet broadcasts, images, and MP3 music files, transmission of contents to unauthorized users is blocked by using various related art methods such as a conditional access system (CAS). In such a method for protecting copyrighted contents, contents can only be played in a specified device, transmission of contents is prohibited even within a home network, or contents are often prohibited from being stored on a device. In such cases, there is a considerable limitation in sharing or playing the web contents on a private home network. This adversely affects AV home-network business from the standpoint of both the consumers and service providers. To overcome such a limitation, a digital transmission content protection over Internet Protocol (DTCP over IP) method has been suggested.

Figure 1:
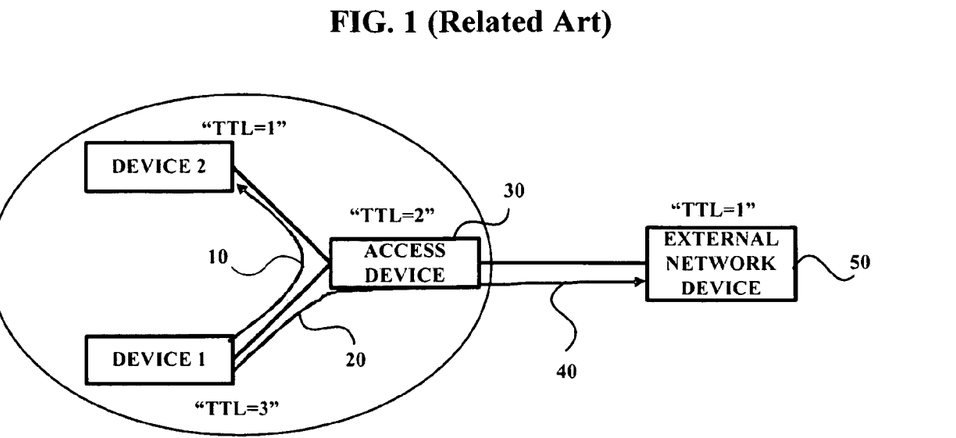
FIG. 1 is a view illustrating the transmission principle of a packet in a home network implemented with a related art DTCP over IP method.

FIG. 1 illustrates a packet transmission flow in a related art home network that employs DTCP over IP.

DTCP over IP is one of methods that enable transmission and play of copyrighted contents in a certain areas such as a home network. More specifically, DTCP over IP restricts transmission of packets having a header indicated with a time-to-live (TTL) value of "3", or restricts a round-trip time (RTT) of packets to 7 ms, so the area to which packets can be transmitted is restricted to a home network.

The packet transmission procedure of DTCP over IP will be described with reference to FIG. 1. When a device 1 transmits packets of copyrighted content to a device 2 through an access device 30, the TTL value of the packets is set to "3" at the start of transmission. Then, when the packets are transmitted from the device 1 to the access device 30, the TTL value of the packet is reduced to "2". Here, since the TTL value is greater than "0", transmission from the access device 30 to the device 2 is allowed and the TTL value is then reduced to "1". Therefore, transmission 10 of copyrighted content packets from the device 1 to the device 2 through the access device 30 is allowed.

Similarly, in the case of an external network, when the device 1 transmits content protected packets, i.e., copyrighted content packets, to a device 50 connected to an external network, transmission 20 from the device 1 to the access device 30 is allowed and the TTL value is then reduced to "2". Again, since the TTL value is greater than "0", packet transmission 40 from the access device 30 to the device 50 connected to the external network is allowed and the TTL value is reduced to "1". Therefore, packet transmission from the device 1 to the device 50 connected to the external network is also allowed.

As described above, when the related art DTCP over IP method is used, there is at least one problem in that the content protected packets may be transmitted to a network connecting apartment complex or to devices outside a home network, which may be connected to the same access network as the home network.

When implementing the DTCP over IP method, transmission of copyrighted content packets to external network still cannot be prevented under the related art standard in which the TTL value of the content protected packet is set to "3", and as a result, the policy that permits the copyrighted contents to be shared only within the authorized home network is often violated. More specifically, the copyrighted content packets in which the TTL value is set to "3" may be transmitted to devices of the external network through an access device such as a gateway that connects the home network with the external network.

The related art methods implementing DTCP over IP have an advantage in that subscribers can freely transmit/share or play copyrighted contents within a home network. However, there is a drawback in that the contents may be transmitted to unauthorized external network.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an access device for preventing transmission of copyrighted contents to an external network and a method for the same, in which copyrighted content packets is prevented from being transmitted to the external network through the access device, and thus unauthorized sharing of copyrighted contents with the external network can be prevented.

According to an aspect of the present invention, there is provided an access device for preventing transmission of copyrighted contents to an external network. The access device includes a packet-header analyzer for analyzing a header of a packet received from a device of a home network, a copyrighted-content sensor for detecting whether the packet includes copyrighted content as a result of analysis by the packet header analyzer, an address converter for converting a source IP address of the packet into an IP address supported by the external network if a destination address of the packet is an address corresponding to the external network as a result of analysis by the packet header analyzer, a mapping-table generator for generating a mapping table for managing a mapping relationship between the source IP address of the packet and the converted IP address supported by the external network, and a packet transmitter for transmitting the packet to the IP address supported by the external network and discarding the packet to block transmission of the copyrighted content to the external network if the copyrighted-content sensor detects that the packet includes the copyrighted content.

According to another aspect of the present invention, there is provided a method of preventing transmission of copyrighted content to an external network, which includes receiving a packet from a device of a home network, extracting a source IP address, a destination IP address and time-to-live (TTL) information of the packet from a header of the received packet, determining whether the packet includes copyrighted content and is transmitted to the external network according to the destination IP address and the TTL information of the packet, and discarding the packet if the packet includes the copyrighted content and is transmitted to the external network.

BRIEF DESCRIPTION OF THE DRAWINGS

The above and other aspects of the present invention will be more apparent from the following detailed description of exemplary embodiments taken in conjunction with the accompanying drawings, in which.

DETAILED DESCRIPTION OF THE EXEMPLARY EMBODIMENTS

Hereinafter, exemplary embodiments will be described in detail with reference to the accompanying drawings. The aspects and features and methods for achieving the aspects and features will be apparent by referring to the exemplary embodiments to be described in detail with reference to the accompanying drawings. However, the present invention is not limited to the exemplary embodiments disclosed hereinafter, but can be implemented in various forms. The matters defined in the description, such as the detailed construction and elements, are provided to assist those of ordinary skill in the art in a comprehensive understanding of the invention. In the whole description of the exemplary embodiments, the same reference numerals are used for the same or similar elements across various figures.

Hereinafter, exemplary embodiments of the present invention will be described with reference to the accompanying drawings illustrating block diagrams and flowcharts. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which comprises one or more executable instructions for implementing the specified logical function(s). It should also be noted that in some alternative implementations, the functions noted in the blocks may occur out of the order. For example but not by way of limitation, two blocks shown in succession may in fact be executed substantially concurrently or the blocks may sometimes be executed in the reverse order, depending upon the functionality involved.

Figure 2:
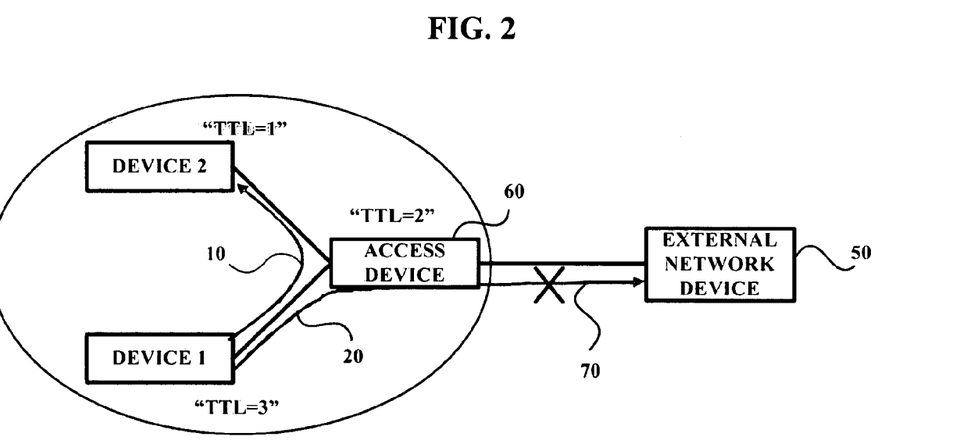
FIG. 2 is a view illustrating the concept of a method of preventing transmission of copyrighted contents to an external network, according to an exemplary embodiment of the present invention.

FIG. 2 illustrates the concept of a method of preventing transmission of copyrighted contents to an external network according to an exemplary embodiment, in which the drawbacks of the related art DTCP over IP method may be overcome, an access device, such as a home gateway that connects home network with the external network, blocks transmission of copyrighted content packets to the external network if the TTL value is less than a specified value.

The related art DTCP over IP method shown in FIG. 1 enables transmission 40 of a packet to an external network device 50 because an access device 30 has a TTL value of 2 hops if a device 1 of the home network intends to transmit a copyrighted content packet to the external network device 50. However, an access device 60 according to an exemplary embodiment analyzes the TTL value indicated in the packet header if a packet received from the home network is one to be transmitted to the external network device 50, and determines the packet as one that includes copyrighted content if the TTL value is less than a value, for example but not by way of limitation, 3. Then, the access device 60 discards the packet and does not transmit the packet to the external network device 50. Therefore, referring to FIG. 2, since the packet received from the device 1 has a TTL value of 2, the access device 60 discards the packet and blocks transmission 70 to the external network device 50.

Figure 3:
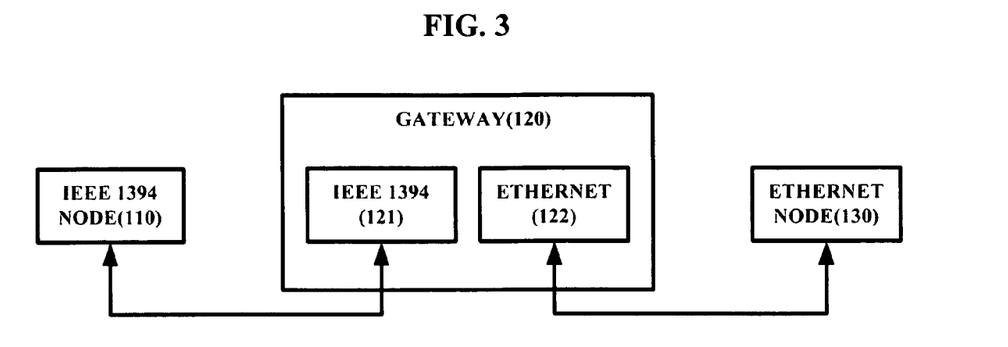
FIG. 3 is a view illustrating the overall construction of a network including an access device for preventing transmission of copyrighted contents to an external network, according to an exemplary embodiment of the present invention.

FIG. 3 illustrates the overall construction of a network including an access device for preventing transmission of copyrighted contents to an external network, according to an exemplary embodiment of the present invention.

FIG. 3 shows an exemplary expandable home theater (XHT) network based on IEEE 1394 standard and an IP network based on the IEEE 802 standard. For linking the two networks, an access device 120 such as a gateway having an IP bridge function provides interactive transmission between the two networks.

An IEEE 1394 node 110 of the XHT network can transmit an IP packet through an IP over IEEE 1394 that supports IP. A middleware 121 that supports IEEE 1394 of the access device 120 executes data communication with the node 110 of the XHT network. The access device 120 can execute data communication with an Ethernet node 130 of the external network through an Ethernet support middleware 122. To this end, home network control protocol (HNCP) or dynamic host configuration protocol (DHCP) over IEEE 1394 is used so that the node 110 of the XHT network can acquire an IP address. A device of a general internet network, such as the Ethernet node 130, can acquire an IP address through DHCP or auto IP.

Figure 4:
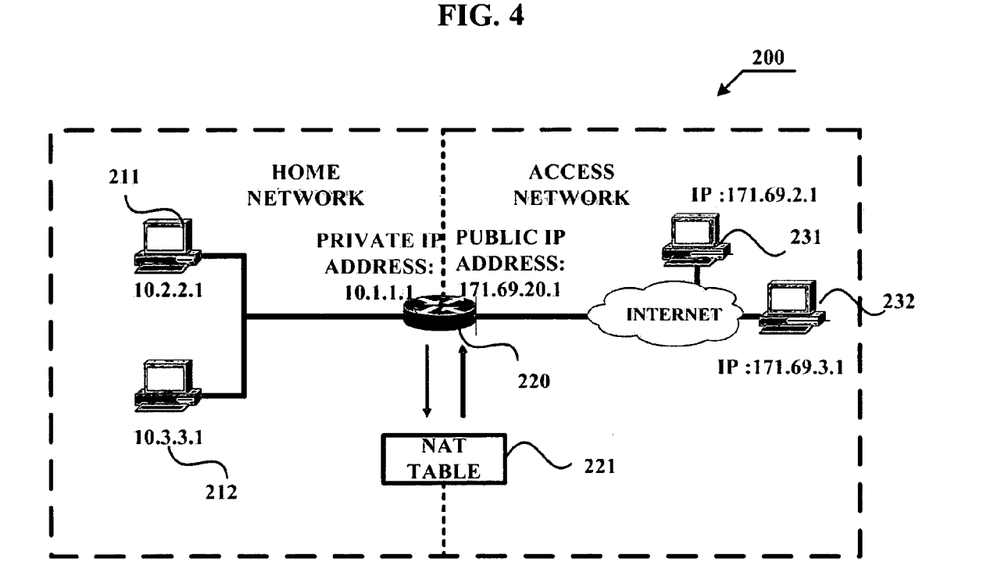
FIG. 4 is a view illustrating the operation principle of an access device for preventing transmission of copyrighted contents to an external network, according to an exemplary embodiment of the present invention.

FIG. 4 illustrates an operation principle of an access device for preventing transmission of copyrighted contents to an external network, according to an exemplary embodiment of the present invention.

An access device 220 that links the home network with the external network serves to convert the IP address on the home network to a public IP address that can be identified on the external network. That is, the access device 220 has a network address translation (NAT) function.

IPv4 addresses assigned to the home network in accordance with Internet Engineering Task Force Request for Comments (IETF RFC) 1918 correspond to addresses in 10.1.1.1~10.127.254.254. Although these addresses are recognized as identifiers that identifies devices within the home network, communication is made essentially through a public IPv4 address when communicating with the external network. To execute communication between a device on the home network and a device on the external network, the access device 220 executes NAT that converts a private Ipv4 address of the home network to a public IPv4 address. At this time, the access device 220 executes address mapping using its public IP address and a port number. Therefore, the device of the external network can identify the device of the home network using an address obtained by a combination of the public IP address of the access device and the port number.

To allow all the devices existing on the home network to communicate with the external network, the above-disclosed address mapping is required. Therefore, the access device 220 can determine whether the devices on the home network transmit data to the external network. Such address mapping can be executed because both the IEEE 1394 network and the internet network, which may be arranged at both sides based on the access device 220, use Internet Protocol. The access device 220 identifies a private IP address of each device on the home network using a port number of TCP/IP protocol. At this time, the access device 220 has a table that matches each in/out private IP with the port number.

For example but not by way of limitation, referring to FIG. 4, for data communication between a device 211 and a device 231 on the external network, the device 211 having a private IP address corresponding to 10.2.2.1 is assigned with a port number, 1024. Here, the access device 220 has the same port number 1024 and the same address, 10.2.2.1. The access device 220 transmits a packet received from the device 211 to the external network through its public IP address, 171.69.20.1 and the port number 1024. At this time, the access device 220 adds to the NAT table 221 address mapping information corresponding to session between the device 211 and the device 231.

The device 231 having the public IP address, 171.69.2.1 cannot identify which device on the home network has transmitted the packet, but can recognize the packet as one transmitted from a home gateway having a public IP. Therefore, the device 231 transmits the packet to the access device 220 using the port number 1024. The access device 220 that has received the packet identifies the port number and searches for address mapping information (first row in table of FIG. 5) having the same port number from the mapping table 221. The access device 220 transmits the packet to 10.2.2.1 mapped on the port number 1024.

Figure 5:
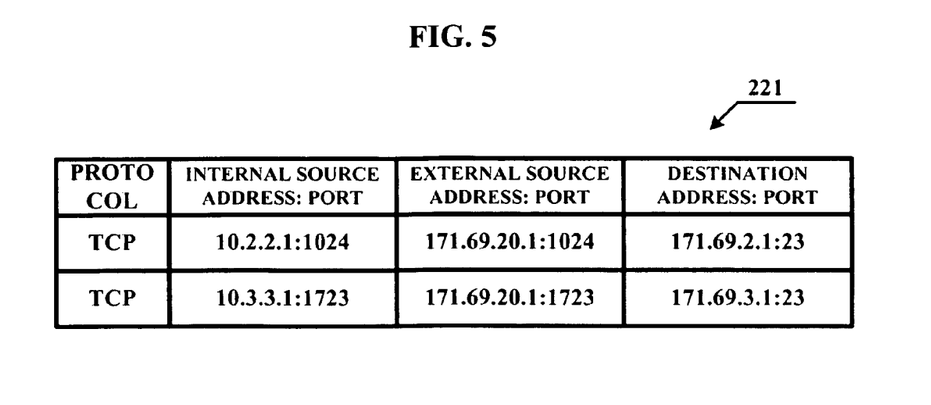
FIG. 5 is a view illustrating a network-address-translation (NAT) table managed by an access device for preventing transmission of copyrighted contents to an external network, according to an exemplary embodiment of the present invention.

FIG. 5 illustrates a network address translation (NAT) table managed by an access device for preventing transmission of copyrighted contents to an external network, according to an exemplary embodiment of the present invention.

The first row of the NAT table represents address mapping information corresponding to session between the device 211 on the home network and the device 231 on the external network, while the second row of the NAT table represents address mapping information corresponding to session between the device 212 on the home network and the device 232 on the external network.

The NAT table may dynamically be generated and updated as described above with reference to FIG. 4. Alternatively, the NAT table may statically be generated.

Figure 6:
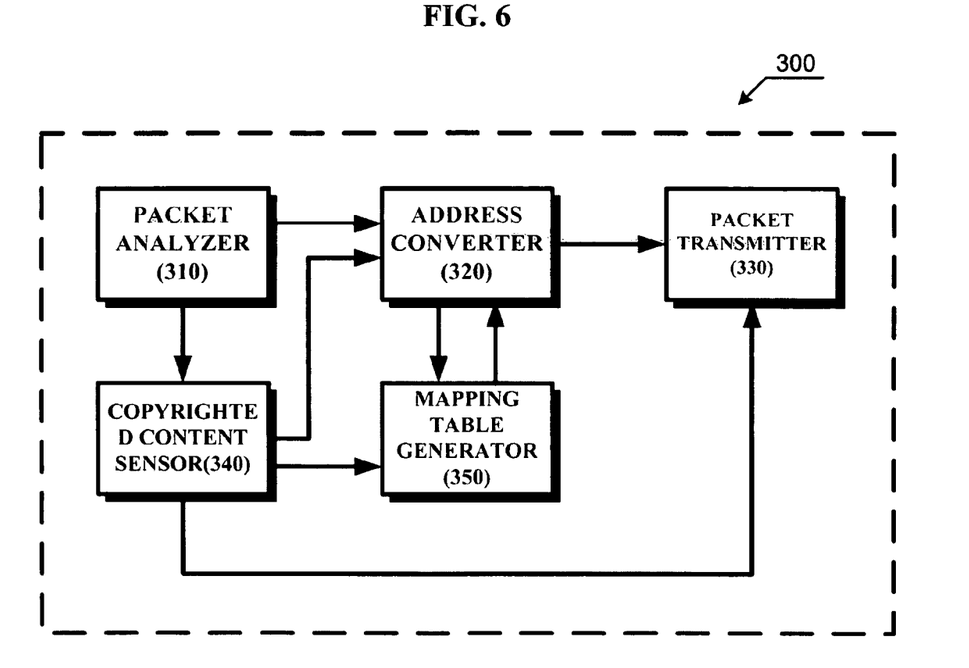
FIG. 6 is a view illustrating the construction of an access device, according to an exemplary embodiment of the present invention.

FIG. 6 is a block diagram illustrating an access device according to an exemplary embodiment of the present invention. An access device 300 includes a packet analyzer 310, an address converter 320, a copyrighted-content sensor 340, a mapping-table generator 350, and a packet transmitter 330.

The packet analyzer 310 receives a packet having a private IP address as a source IP address from a device on a home network and analyzes the packet header. If the packet is one transmitted to a device on an external network, the source address of the packet represents a private IP address of the device on the home network and a destination address represents a public IP address of the device on the external network. A structure of the packet will be described with reference to FIG. 7. The packet analyzer 310 parses the packet to acquire a time-to-live (TTL) field of the packet, the source IP address, and the destination IP address from the packet header.

The copyrighted-content sensor 340 detects that the packet includes copyrighted content if the TTL field value of the packet from the packet analyzer 310 is less than a specified value. For example, if the TTL field value of the packet is less than or equal to three hops under the related DTCP over IP protocol standard, the packet is regarded as one that includes copyrighted content and thus should be prevented from being transmitted to the external network. However, since a reference value of the TTL field that determines whether the packet includes copyrighted content may be varied, the exemplary embodiment can be applied to the reference value of every TTL field.

After detecting that the received packet includes copyrighted content, the copyrighted-content sensor 340 provides the copyrighted-content detection information to the address converter 320, the mapping-table generator 350 or the packet transmitter 330, so as to block transmission of the packet to the external network. More specifically, if the input packet corresponds to a copyrighted content packet, the copyrighted-content sensor 340 controls the address converter 320 to not execute the address conversion or terminate the address conversion if address conversion has been executed by the address converter 320, and the copyrighted-content sensor 340 controls the mapping-table generator 350 to discard mapping information so as to not update the mapping table with mapping information. If the mapping table is not dynamically but statically made, the copyrighted-content sensor 340 controls the packet transmitter 330 to discard the packet so as to prevent transmission of the packet to the external network.

The address converter 320 receives the source IP address and the destination IP address from the packet analyzer 310 and converts the private IP address of the source to the public IP address if the destination address corresponds to an address of the device on the external network. The method of converting the private IP address to the public IP address is as follows.

The access device 300 identifies the private IP address of each device on the home network through the port number of TCP/IP protocol. The private IP address of each device is converted to a public IP address by using a combination of the port number and the public IP address of the access device 300, and the device on the external network can communicate with the device on the home network using the converted public IP address. The address converter 320 transmits information on session between the source device and the destination device, i.e., mapping information on the private IP address and the public IP address of the source device on the home network and the IP address of the destination device, to the mapping-table generator 350.

On the other hand, if the copyrighted-content sensor 340 provides the copyrighted-content detection information to the address converter 320 that the packet to be transmitted to the external network includes copyrighted content, the address converter 320 may not execute mapping of the source address.

The mapping-table generator 350 updates information corresponding to session transmitted from the address converter 320, i.e., a mapping-information list of the private IP address and the public IP address of the source device and the IP address of the destination device, to the mapping table. An outline of the mapping table is as shown in FIG. 5, as disclosed above. Alternatively, if the copyrighted-content sensor 340 provides the copyrighted-content detection information to the mapping-table generator 350 that the packet to be transmitted to the external network includes copyrighted content, the mapping-table generator 350 does update the mapping table with a list corresponding to mapping information of the corresponding session.

If the input packet includes copyrighted content, the packet transmitter 330 discards the packet to block transmission of the packet to the external network. If the input packet does not include copyrighted content, the packet transmitter 330 transmits the packet to the external network device corresponding to the destination IP address.

In the exemplary embodiment, each component as illustrated in FIG. 6 may include, but is not limited to, a software or hardware component, such as a field programmable gate-array (FPGA) or application-specific integrated circuit (ASIC), which performs certain tasks. A module may be configured to reside on the addressable storage medium and configured to execute on one or more processors. The functionality provided in the components and modules may be combined into fewer components and modules or further separated into additional components and modules.

Figure 7:
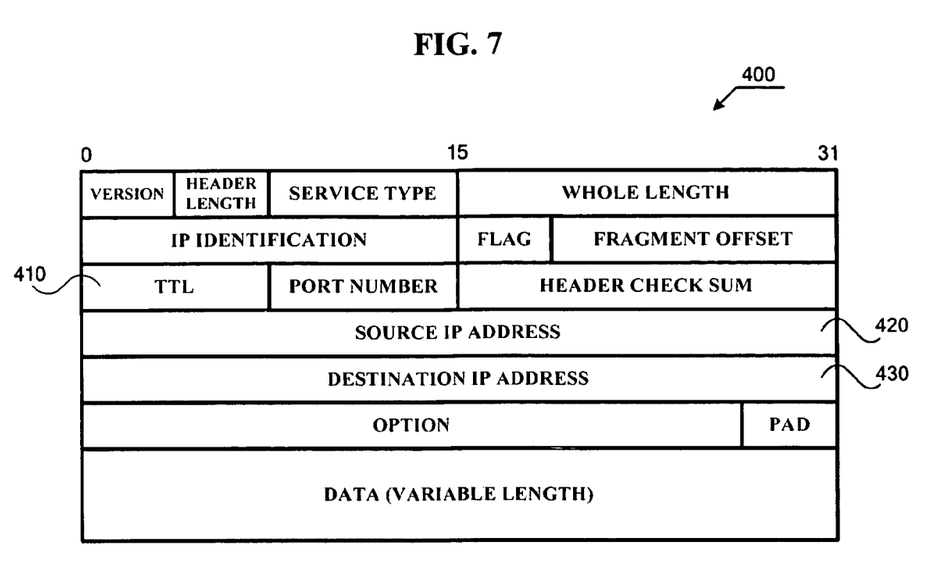
FIG. 7 is a view illustrating the structure of a packet including an IP header.

FIG. 7 illustrates the structure of a packet 400 including an IP header. A header of the packet includes a field having version information, a field having a value indicating the length of the header, a field representing service types, a field having a value indicating the whole length of the packet, an IP identification field, a flag field, and a fragment offset field.

If the packet is transmitted from the device on the home network to the device on the external network, a TTL field 410 represents TTL of the packet within a network as the number of hops, a source IP address field 420 indicates a private IP address of the device on the home network, and a destination IP address 430 indicates a public IP address of the device on the external network.

Figure 8:
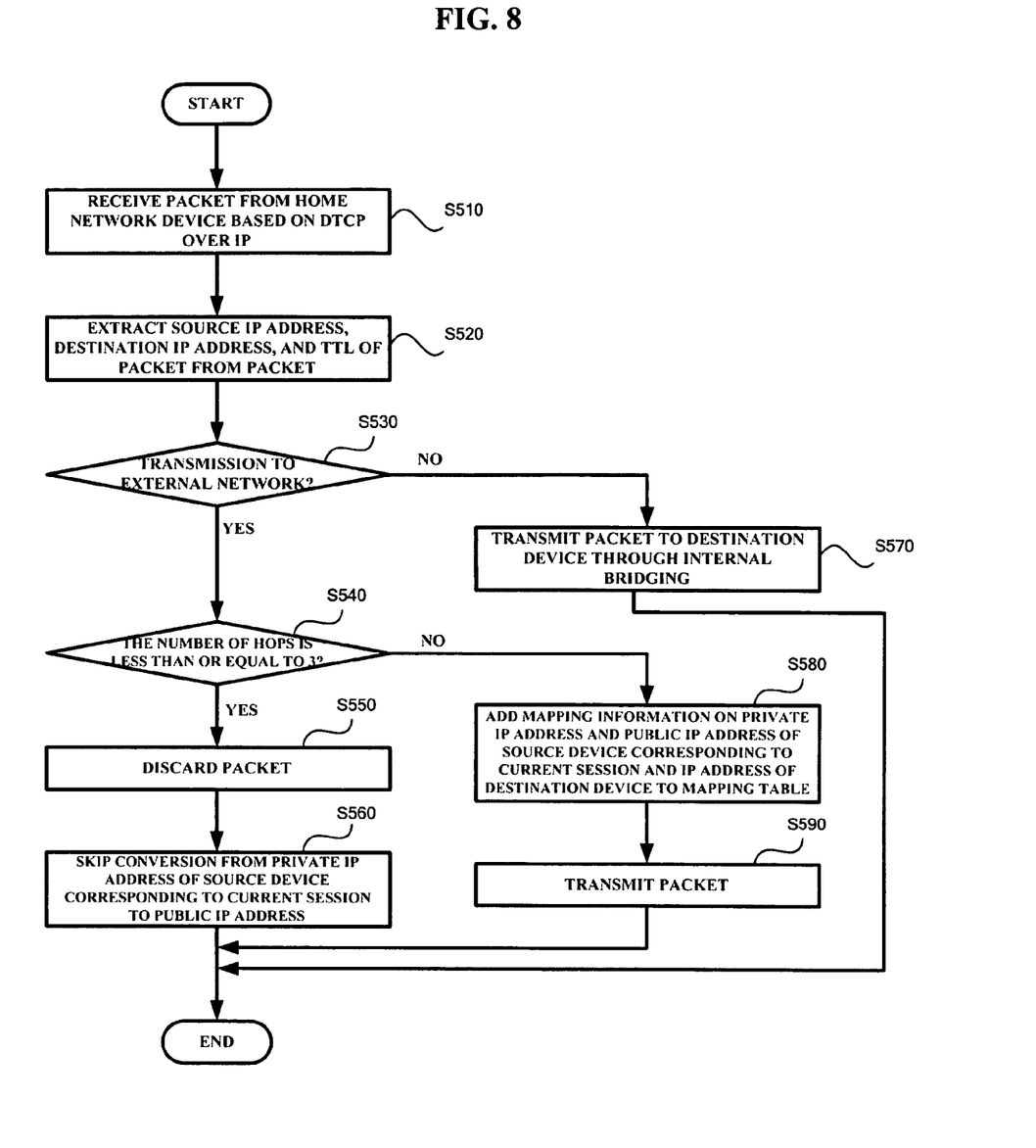
FIG. 8 is a flowchart illustrating a method of preventing transmission of copyrighted contents to an external network, according to an exemplary embodiment of the present invention.

FIG. 8 is a flowchart illustrating a method of preventing transmission of copyrighted contents to an external network, according to an exemplary embodiment of the present invention.

The access device 300 according to an exemplary embodiment receives the packet from the device on the home network that employs the DTCP over IP method (operation S510), and extracts the source IP address 420, the destination IP address 430, and the TTL information 410 of the packet from the packet header (operation S520).

The access device 300 determines whether the packet is to be transmitted to the external network, in accordance with the destination IP address 430 (operation S530). If the destination IP address 430 corresponds to the IP address of the device on the external network (YES in operation S530), the access device 300 determines whether the packet includes copyrighted content (operation S540).

In the exemplary embodiment shown in FIG. 8, if the TTL field value 410 of the packet is less than or equal to three hops, the access device 300 determines the packet as one that includes copyrighted content (operation S540) and blocks transmission of the packet to the external network. The method of blocking transmission of packets to the external network includes discarding the packet as shown in FIG. 6 (operation S550), and skipping conversion of the private IP address of the source device corresponding to current session to the public IP address (operation S560).

The operation of skipping conversion of the private IP address of the source device corresponding to current session to the public IP address S560 can be achieved by controlling the address converter 320 of the access device 300 to not convert the private IP address of the source device to the public IP address or terminate the address conversion if address conversion has been executed, or controlling the mapping-table generator 350 to not update the mapping table with the mapping information on the destination IP address, the public IP address and the private IP address of the source device corresponding to current session.

Furthermore, if the mapping table is statically generated, the corresponding packet is discarded to block transmission of the packet to the external network.

Alternatively, if the packet is not transmitted to the external network (NO in operation S530), the access device 300 transmits the packet to the destination device within the home network through internal bridging (operation S570).

Furthermore, if the packet is transmitted to the external network (YES in operation S530) and the TTL value is greater than a specified value, for example but not by way of limitation, three hops (NO in operation S540), the access device 300 determines the packet as one that does not include copyrighted content, and updates the NAT table with the mapping information on the private IP address and the public IP address of the source device corresponding to current session and the IP address of the destination device (operation S580). The access device 300 transmits the packet to the device on the external network (operation S590).

As described above, in the access device for preventing transmission of copyrighted contents to an external network and the method for the same, transmission of copyrighted-content packets to the external network is blocked by the access device that links the home network with the external network, so as to prevent copyrighted contents from being shared with the unauthorized external network.

Although exemplary embodiments have been described for illustrative purposes, those skilled in the art will appreciate that various modifications, additions and substitutions are possible, without departing from the scope and spirit of the invention as disclosed in the accompanying claims.

What is claimed is:

1. An access device for preventing transmission of copyrighted content to an external network, comprising:
    a packet-header analyzer which analyzes a header of a packet received from a device of a home network;
    a copyrighted-content sensor which detects whether the packet includes the copyrighted content, based on analysis by the packet-header analyzer for blocking transmission of the copyrighted content to the external network;
    an address converter which converts a source Internet Protocol (IP) address of the packet into an IP address supported by the external network if a destination address of the packet is an address corresponding to the external network, based on the analysis by the packet-header analyzer;
    a mapping-table generator which generates a mapping table configured to manage a mapping relationship between the source IP address of the packet and the converted IP address supported by the external network; and
    a packet transmitter which transmits the packet to the IP address supported by the external network,
    wherein the packet-header analyzer extracts time to live (TTL) information of the packet from the header of the packet,
    the copyrighted-content sensor determines that the packet includes the copyrighted content if a TTL value of the packet is less than a certain value equal to or less than three, the TTL value is greater than 0, and controls for blocking transmission of the copyrighted content to the external network when it is determined that the packet includes the copyrighted content.

2. The access device as claimed in claim 1, wherein the home network employs digital transmission content protection (DTCP) over IP.

3. The access device as claimed in claim 1, wherein the packet-header analyzer extracts a source IP address, and a destination IP address, from the header of the packet.

4. The access device as claimed in claim 1, wherein the mapping-table generator does not update the mapping table with IP address mapping information corresponding to the packet if the copyrighted-content sensor detects that the packet includes the copyrighted content.

5. The access device as claimed in claim 1, wherein the TTL information of the packet comprises TTL field information.

6. The access device as claimed in claim 1, wherein the source IP address of the packet corresponds to an address between 10.1.1.1 and 10.127.254.254.

7. The access device as claimed in claim 1, wherein the converted IP address supported by the external network corresponds to a combination of a public IP address and a port number of the access device of the home network.

8. The access device as claimed in claim 1, wherein the packet transmitter transmits the packet to the IP address supported by the external network, if the copyrighted-content sensor detects that the packet does not include the copyrighted content, and
    the packet transmitter immediately discards the packet, if the copyrighted-content sensor detects that the packet includes the copyrighted content.

9. A method of preventing transmission of copyrighted contents to an external network, comprising:
    receiving a packet from a device of a home network;
    extracting a source Internet Protocol (IP) address, a destination IP address and time-to-live (TTL) information from a header of the received packet;
    determining whether the packet includes copyrighted content and is to be transmitted to the external network, in accordance with the destination IP address and the TTL information of the packet; and
    discarding the packet if the packet includes the copyrighted content and is to be transmitted to the external network,
    wherein the determining comprises:
    determining that the packet includes the copyrighted content if a TTL value of the packet is less than a certain value equal to or less than three, the TTL value is greater than 0; and
    controlling for blocking transmission of the copyrighted content to the external network when it is determined that the packet includes the copyrighted content.

10. The method as claimed in claim 9, wherein the home network employs digital transmission content protection (DTCP) over IP.

11. The method as claimed in claim 9, wherein the determining comprises:
    determining whether the destination IP address of the packet corresponds to an IP address supported by the external network; and
    determining whether the TTL value of the packet is less than the certain value if the destination IP address of the packet corresponds to the IP address supported by the external network.

12. The method as claimed in claim 9, wherein the TTL information of the packet corresponds to TTL field information.

13. The method as claimed in claim 9, wherein the IP address of the packet received from the device of the home network corresponds to an address between 10.1.1.1 and 10.127.254.254.

14. The method as claimed in claim 9, further comprising transmitting the packet to the destination IP address supported by an external network, if it is determined that the packet does not include the copyrighted content, and
    the discarding the packet comprises immediately blocking transmission of the copyrighted content to the external network by discarding the packet, if it is determined that the packet includes the copyrighted content.

15. A non-transitory recording medium recorded with a computer-readable program having a method for preventing transmission of copyrighted contents to an external network, the method comprising: receiving a packet from a device of a home network; extracting a source IP address, a destination Internet Protocol (IP) address and time-to-live (TTL) information from a header of the received packet; determining whether the packet includes copyrighted content and is to be transmitted to the external network, in accordance with the destination IP address and the TTL information of the packet; and discarding the packet if the packet includes the copyrighted content and is to be transmitted to the external network, wherein the determining comprises: determining that the packet includes the copyrighted content if a TTL value of the packet is less than a certain value equal to or less than three, the TTL value is greater than 0; and controlling for blocking transmission of the copyrighted content to the external network when it is determined that the packet includes the copyrighted content.

16. The non-transitory recording medium of claim 15, wherein the home network employs a digital transmission content protection (DTCP) over IP method.

17. The non-transitory recording medium of claim 15, wherein the determining comprises: determining whether the destination IP address of the packet corresponds to an IP address supported by the external network; and determining whether the TTL value of the packet is less than the certain value if the destination IP address of the packet corresponds to the IP address supported by the external network.

18. The non-transitory recording medium as claimed in claim 17, wherein the IP address of the packet received from the device of the home network corresponds to an address between 10.1.1.1 and 10.127.254.254.

19. The non-transitory recording medium as claimed in claim 15, further comprising transmitting the packet to the destination IP address supported by the external network, if it is determined that the packet does not include the copyrighted content, and the discarding the packet comprises immediately blocking transmission of the copyrighted content to the external network by discarding the packet, if it is determined that the packet includes the copyrighted content.

* * * * *